Patented Sept. 21, 1943

2,330,079

UNITED STATES PATENT OFFICE 2,330,079

PROCESS FOR ISOMERIZING PARAFFINIC HYDROCARBONS

John J. Owen, Baton Rouge, La., assignor to Standard Oil Development Company, a corporation of Delaware No Drawing. Application January 25, 1940, Serial No. 315,527

14 Claims. (Cl. 260—683.5)

This invention relates to the isomerization of straight chain paraffinic hydrocarbons, in particular, the lower members of the series, for example, normal butane, normal pentane, normal hexane, and the like, to produce the corresponding isoparaffins, in particular, isobutane, isopentane, isohexane, and the like.

It is known to use Friedel-Crafts type catalysts, for example, halides of aluminum, zinc, iron, titanium, etc., as catalytic agents for the isomerization of normal paraffinic hydrocarbons to form branched chain paraffinic hydrocarbons. Ordinarily, these catalysts have been employed in conjunction with activators, for example, hydrogen chloride, hydrogen bromide, water, and the like, to increase the rate of conversion to the desired isomers. Ipatieff and Grosse, in Ind. & Eng. Chemistry, vol. 28 (1936), pages 461 through 464, describe a series of experiments in which normal butane was contacted with aluminum chloride and hydrogen chloride in a rotating autoclave of about 800 cc. capacity, the aluminum chloride being placed in a glass liner and the normal butane being maintained in the liquid phase. Temperatures as high as 350° F. were employed to effect an isomerization of the normal butane. However, at the high temperatures considerable decomposition occurred with the formation of high and low boiling hydrocarbons as well as isobutane.

British Patent 498,463 discloses the isomerization of normal pentane to produce substantial yields of isopentane by subjecting the normal pentane to contact with the catalyst comprising aluminum chloride in an amount not more than 10% by weight of the normal pentane and in the presence of hydrogen chloride in an amount not exceeding 2% by weight of the normal pentane. Temperatures of from atmospheric up to 200° C. are employed.

Indian Patent 24,044, accepted August 23, 1937, discloses the isomerization of various straight chain paraffinic hydrocarbons to produce isoparaffinic hydrocarbons in the presence of metal halides, for example, aluminum chloride and hydrogen halides. It is stated that the required amount of hydrogen halide should not exceed 5% and that the necessary amounts of hydrogen halide may, if desired, be generated in situ by the addition of small amounts of water or steam to the reaction zone. Obviously, such a procedure is expensive from a commercial standpoint for the reason that in generating hydrogen chloride, for example, from aluminum chloride by the addition of appreciable amounts of water or steam thereto, a marked degradation of the aluminum chloride catalyst is necessary in order to hydrolyze sufficient quantities of it to produce the required amounts of hydrogen chloride. This necessitates the replacement of the spent aluminum chloride catalyst at more frequent periods than would be the case where the hydrogen chloride had been extraneously produced and added to the system. According to the process of the present invention, such a procedure has been found to be not only uneconomical but is distinctly detrimental to the production of optimum yields of the desired isomeric paraffins.

Although small amounts of hydrogen halides have been used in the past it is known that by using larger amounts of hydrogen halide under suitable reaction conditions that reaction time can be materially reduced making the process more economical commercially.

It has now been found that in the isomerization of paraffin hydrocarbons with aluminum halides, for example, aluminum chloride, and in the presence of at least one hydrogen halide, for example, hydrogen chloride, which is employed as an activator for the reaction, the concentration of hydrogen halide required for the activation can be materially reduced over those quantities heretofore thought to be necessary to give high conversions with short reaction times by using a small amount of water in the reaction zone in contact with the aluminum chloride so as to maintain in that zone a definite ratio of water, hydrogen chloride and aluminum chloride. If a small concentration of water, for example, from about 0.1 to not more than about 2% based on the total amount of paraffins present in the reactor at any one time, is maintained in the reaction zone in the presence of the aluminum halide catalyst, the concentration of hydrogen halide, for example, hydrogen chloride, required for activation can be greatly reduced. If large amounts of water, that is, amounts above 2% are employed, substantial and rapid degradation of the aluminum halide results and the catalyst is necessarily quickly destroyed. It has also been found that the effect of the water is accumulative. Therefore, the water which is added at the start of the reaction remains in the reactor for extended periods of time. In practicing the present invention, it is only necessary to maintain the desired percentages of water in the reaction chamber in contact with the aluminum chloride while continuously adding the feed stock and the hydrogen chloride activator. Since some water may gradually be lost in continuous operation, further quantities of water may be required to maintain in the reaction mixture a definite ratio of water, hydrogen chloride and aluminum chloride.

It is not known in exactly what form the water is held in the reaction zone. It may be that an aluminum chloride hydrate is formed which does not decompose under the reaction conditions. On the other hand, it may be that a pseudo hydrolysis of the aluminum chloride is effected. However, the amount of water maintained in the reaction zone is not sufficiently large to effect an ordinary hydrolysis reaction of the aluminum chloride. By reason of the fact that the water is apparently tenaciously held in contact with the catalyst, the exact catalyst composition is not known. However, the process of the present invention is not intended to be limited by any theory of operation or by any theory of catalyst composition. It is sufficient to state that the invention may be practiced by maintaining between about 0.1 and about 2% of water based on the total amount of hydrocarbons present in the reactor at any one time, in the catalyst zone in contact with the catalyst in some form or other either in a free state or combined with the aluminum chloride, and to maintain this quantity of water substantially within those limits during the isomerization process. By following this procedure, not only is the degradation of the aluminum chloride catalyst effectively minimized, but it has been found that the amount of hydrogen chloride required to effect substantially the same conversions as those obtained in the absence of these small amounts of water may be materially decreased. The usual quantities of hydrogen chloride may be employed in which case the reaction time may be materially reduced. From a practical standpoint, it may be preferred to operate with the minimum amount of hydrogen chloride both from the standpoint of the original cost of the hydrogen chloride and also from the standpoint of the cost of the necessary equipment. For example, in processes wherein as much as 15% of hydrogen chloride is employed in the catalyst zone in solution in the hydrocarbon mixture, a pressure of around 180 lbs./sq. in. is required, whereas where only 5% hydrogen chloride is present in the paraffinic reactants, only around 40 lbs./sq. in. is necessary. This reduction in pressure affords a saving in the cost of the pressure equipment required, also, by reason of the fact that smaller amounts of hydrogen chloride are initially employed, the cost of the recovery of the hydrogen chloride from the isomerized mixture is correspondingly reduced.

The process may be employed for the isomerization of normal butane, normal pentane, normal hexane, and the higher straight chain paraffins, either as single compounds or in admixtures with one another. Field butanes, light straight run paraffinic naphthas, refinery $C_4$ and/or $C_5$ cuts freed of olefins, are likewise suitable feed stocks.

It is known to isomerize these hydrocarbons under various reaction conditions. These reaction conditions such as time, temperature, catalyst concentration, and hydrogen halide concentration are interrelated and for a given conversion to isoparaffin may be varied over fairly wide limits. For example, for a given conversion of n-butane to isobutane using the same amounts of aluminum halide and hydrogen halide, the reaction time can be reduced one-half by increasing the temperature from about 200° F. to about 225° F. Similarly, for a given conversion employing the same temperature and catalyst concentration, the amount of hydrogen halide may be reduced one-half by doubling the reaction time. However, optimum conditions for isomerizing one normal paraffin differ from those required for isomerizing another n-paraffin and for each varied feed stock a different correlation of reaction conditions is desirable. Normal butane may be isomerized using between about 10 and about 50% of aluminum chloride based on the total amount of hydrocarbon present in the reaction chamber with the aluminum chloride at any one time. The temperatures ordinarily employed lie between about 100 and about 250° F. The percentage of hydrogen halide, for example, hydrogen chloride, employed may range from about 1% and about 20% based on the total hydrocarbons present in the reaction chamber at any one time. It is necessary, however, in obtaining optimum results, to correlate the amount of catalyst and activator with respect to the particular temperature employed.

As compared with the isomerization of normal butane, normal pentane presents an entirely different problem. Reaction conditions, particularly temperature and time, are relatively mild as compared to the conversion of normal butane to isobutane. This results from the fact that normal pentane isomerizes more readily than does normal butane. Operation under mild conditions (particularly lower temperatures) with normal pentane feed is essential to acquire a relatively high selectivity. The higher temperatures are detrimental to the isomerization of normal pentane since increased cracking occurs at these higher temperatures.

In carrying out the present invention for the isomerization of paraffinic hydrocarbons, temperatures of between about −50 and about 250° F. may be employed, lower temperatures being employed in connection with the isomerization of the higher hydrocarbons having a greater tendency to crack, for example, normal pentane, normal hexane, etc.

The aluminum halide catalyst should be present in amounts ranging from about 10 to about 150% based on the total hydrocarbons present in the reactor at any one time and, in the case of normal pentane, normal hexane, and the like, the catalyst concentration should be preferably at least 100%. With butane, however, catalyst concentrations between about 10 and about 50% are desired.

From about 1 to about 20% of hydrogen halide, based on the total hydrocarbons present in the reaction zone, may be employed. However, as previously stated, it is preferred for economic reasons and without sacrificing to any great extent the yields obtained to operate with between about 1 and about 11% of hydrogen halide. The total amount of activator to be added to the reaction mixture at any one time depends to a large extent upon the amount of water maintained in the reaction zone. For example, in normal pentane isomerization, with about 1% of water present, the hydrogen halide concentration may be from about 2% to about 6% whereas when 0.5% of water is present, the hydrogen halide concentration may be from about 10 to about 20%, under otherwise comparable reaction conditions. On the other hand, if the hydrogen halide is permitted to remain in amounts customarily employed in the absence of measurable amounts of water, and water in the designated amounts is then added, the reaction time required for a given conversion is markedly decreased in comparison to running without water.

The time of contact of the hydrocarbon feed with the catalyst and activators may range between about ½ hour and about 15 hours, the milder conditions of reaction being maintained over the longer periods of time. Vigorous agitation of the reaction mixture with the catalyst is desirable for effecting optimum yields of the desired isomeric paraffins. Likewise, in order to effectively agitate, it is preferred to maintain liquid phase operation.

The particular size of the catalyst is preferably maintained at at least 20 mesh. However, even more finely divided catalyst may be employed, for example, up to about 200 mesh. It has been found that the increased surface of the catalyst materially aids in an efficient isomerization reaction. The hydrogen halide employed as the activator, and which may be directly introduced into the reaction previously admixed with the feed, may be either hydrogen chloride, hydrogen bromide, or hydrogen fluoride or mixtures of two or more of these.

The reacted mixture, upon being discharged from the reactor or series of reactors, is subjected to a fractional distillation to remove the hydrogen halide which may then be returned to the isomerization zone or zones and the mixture of normal and branched chain paraffins may then be treated with caustic to remove the last traces of promoter and, if desired, subjected to fractional distillation to separate the branched chain products from the straight chain products and separate out degradation products. The unreacted normal paraffins may then be recycled to the original isomerization zone or zones and the branched chain isomers employed in any number of suitable ways. In commercial operations, the isomerization reaction is carried out in a single reactor or series of reactors equipped with an efficient stirring or mixing device, for example, a mechanical agitator, such as a motor driven propeller, jets of restricted internal diameter, turbo mixers and the like. Where a series of reactors are employed, the various stages of the reaction may be more carefully controlled and the reaction during the course of its progress toward completion may be controlled with a greater flexibility and with a corresponding economy in operation due to the fact that the temperatures, rates of throughput, and the like may be accurately controlled with respect to each stage of the reaction. Thus, the first of a series of three reactors connected in series may be maintained at a temperature of approximately 100° F. The second may be maintained at a temperature of about 50 or 60° F. and the third may be maintained at a temperature of around 30° F. when employing a feed stock comprising essentially normal pentane. The length of residence in the reactors would correspondingly be about ½ hour in the first reactor, about 1 hour in the second reactor and about 5 hours in the third reactor. By employing such a series of reactors it is possible to attain, under the above described conditions, a conversion of normal pentane to isopentane of between about 75 and 85% with a minimum amount of degradation products being formed. Where a number of batch or semi-batch reactors are connected in series, the catalyst in each reaction zone is independently treated with the required quantities of water and the maintenance of that water concentration in the reaction zones is independently controlled. The water may be added intermittently to the feed stock going to the first reactor in order to maintain the desired water concentration. Further quantities of water may be introduced into the partially isomerized feed proceeding to the subsequent reactors.

The catalyst in either a single or multiple stage reaction system may be held in the reactor by employing a suitable screen or filter at the point of the discharge of the reacted or partially reacted hydrocarbon mixture. A Cuno filter may be employed desirably for this purpose. In cases where the catalyst employed has a relatively large particle size and wherein the rate of throughput of the feed is fairly slow, the intensity of agitation being constant, it is possible to carry out the process in such a manner as to obviate the necessity for employing a filter. This is particularly true where the feed stock enters the reactor at the bottom and leaves at or near the top. Very little of the catalyst is carried over by such an operation. Continuous operation has an advantage in that the catalyst degradation is maintained at a minimum in contrast to the use of a series of batch operations employing the partially spent catalyst from a preceding batch operation in which the degree of catalyst degradation may be found to be excessive due to the fact that all of the hydrocarbons are not removed from contact with the catalyst at periods between the various batch operations.

In order to more fully disclose the nature of the invention, the following examples are given. However, it should be distinctly understood that these examples are presented merely as illustrative of rather than limitative to the specific types of operation of the invention.

EXAMPLE 1

Normal butane was contacted with AlCl₃ in an amount of about 20% by weight based on the total hydrocarbon present in the reactor at any one time. The temperature was maintained at about 200° F. The reaction was conducted in batch operations the same catalyst mass being used repeatedly with fresh charges of normal butane. The normal butane in liquid phase was saturated with water at about room temperature before being introduced into the reactor, and contained less than about 0.1% of H₂O dissolved therein. Each charge of normal butane was contacted with the catalyst for about 4 hours with agitation in a reaction bomb maintained under a pressure of about 280 lbs./sq. in. gauge. After six successive runs, in which yields of 30 to 35% by volume of isobutane were obtained, the yield of isobutane decreased rapidly in the two following runs to about 7 or 8% by volume. The ninth run was carried out under substantially identical reaction conditions using the catalyst from the eighth run, except that substantially dry normal butane replaced the wet normal butane and about 2.66% by weight of HCl was charged to the reactor. After about 4 hours of operation, the product contained about 58.5% by volume of isobutane. A tenth run, using the catalyst from the ninth run, was made employing the same feed stock as was used in the first eight runs and omitting the addition of HCl. The product contained only about 34% by volume of isobutane which amounted to substantially the same yield as had been obtained in the first six successive runs.

The ninth run in which a high yield of isobutane was obtained was duplicated under substantially identical reaction conditions, except that fresh AlCl₃ was employed and substantially no water was present. A product containing only about 45% by volume of isobutane was obtained in contrast to obtaining a product containing about 58.5% by volume of isobutane when employing partially spent AlCl₃ previously used with wet feed, then used subsequently with a feed containing about 2.66% by weight of HCl.

Under substantially identical conditions of operation as above stated, where no appreciable amounts of $H_2O$ or HCl were used, the product contained only about 8% by volume of isobutane.

In another run carried out under substantially identical conditions as given in Example 1 except that fresh AlCl₃ was used with about 1.3% by weight of $H_2O$, and no HCl, as such, were employed, a product containing about 46% by volume of isobutane was obtained. The 1.3% of $H_2O$ was stoichiometrically equivalent to about 2.7% of HCl, which may have been formed by interaction with the AlCl₃. The use of about 2.7% by weight of HCl without using any $H_2O$ gave only a 45% by volume yield of isobutane in the product. These yields represent a loss of about 12-13% by volume of isobutane over the yield of about 58.5% obtained when using about 2.7% of HCl in conjunction with the partially spent catalyst from the wet normal butane runs.

EXAMPLE 2

A shaking bomb was charged in a series of experiments with normal pentane and an equal amount by weight of AlCl₃. To this reaction mixture various amounts of HCl and/or $H_2O$ were added, the reactor, maintained at room temperature, was intensively agitated, and the reacted mixture was discharged and analyzed after about 2 hours of reaction. Fresh AlCl₃ was employed in each run. The percentages of $H_2O$ and HCl present and yields of isopentane obtained in each run are shown in Table I. The percentages of $H_2O$ and HCl are by weight based on the total hydrocarbons present in the reactor. The percentage of isopentane is by volume based on the total volume of the reacted hydrocarbon mixture.

Table

| Run | $H_2O$ | HCl | Isopentane |
|---|---|---|---|
| | Per cent | Per cent | Per cent |
| A | 0.0 | 15.2 | 28 |
| B | 0.5 | 14.7 | 44 |
| C | 0.7 | 15.1 | 69 |
| D | 0.8 | 10.3 | 41 |
| E | 0.0 | 10.3 | 24 |
| F | 1.0 | 3.2 | 33 |
| G | 1.0 | 5.1 | 51 |
| H | 2.6 | 0.0 | 3 |

The use of 2.6% of water with no HCl gave but slight isomerization while the use of no water and about 10.3% of HCl gave about 24% of isopentane. On the other hand, the use of only 1% of $H_2O$ and only 5.1% of HCl gave 51% of isopentane.

EXAMPLE 3

A glass bomb was charged with normal butane and AlCl₃ in an amount of about 15% by weight based on butane, and to this mixture was added 2% by weight of HCl and 0.5% by weight of water based on butane. A temperature of about 212° F. was maintained while agitating the reaction mixture by means of a mechanical shaker. At the end of 12 hours an analysis showed that 77.4% of the normal butane had reacted and that a 61% yield of isobutane had been produced.

EXAMPLE 4

In a series of experiments normal butane was contacted with AlCl₃ in an amount of about 15% by weight based on the butane. The experiments were conducted batchwise in sealed glass tubes at 212° F. for six hours while maintaining agitation by means of a mechanical shaker. Various amounts of HCl and/or $H_2O$ were employed as catalyst promoter in the different experiments. At the end of the experiments the products were analyzed and the yield data were expressed in terms of the percentage increase in the normal butane reacting and in the isobutane produced in comparison with the results obtained when employing no promoter under substantially identical conditions.

In the first experiment HCl was employed as catalyst promoter in an amount of about 8.2% by weight based on the butane feed. Analysis of the product showed an increase of 32.5% in the normal butane reacting and an increase of 31.3% in the isobutane produced, over the amounts obtained when no promoter was employed. In the second experiment under substantially identical conditions 8.2% HCl and 0.45% $H_2O$ based on the butane were employed as catalyst promoter. Analysis of the product at the end of the experiment showed an increase of 60.9% in the normal butane reacting and an increase of 59.7% in the isobutane formed, over the amounts obtained when no promoter was employed. In the third experiment of the series 0.45% $H_2O$ was added to the reactor to serve as catalyst promoter but no HCl was added. The product analysis showed increases of 34.2% in both the normal butane reacting and the isobutane produced, over the amounts obtained when no promoter was employed.

In a fourth experiment conducted under substantially the same conditions 8.2% HCl and 0.90% $H_2O$ were used as promoter. This experiment duplicated the second experiment except for the larger amount of $H_2O$ employed. There was an increase of 60.2% in the normal butane reacting over the amount reacting when no promoter was employed, which was about the same as the increase observed in the second experiment. There was also an increase in isobutane yield of 50.5% which is somewhat lower than the 59.7% increase in yield which occurred in the second experiment in which less $H_2O$ was employed. In the fifth experiment of the series the catalyst promoter consisted of 0.90% $H_2O$. In this case the normal butane reacting and the isobutane produced were each 30.9% greater than when no promoter was employed.

A comparison of the data obtained in these experiments shows that the use of both water and HCl in controlled amounts results in a greater increase in conversion and in yield than the use of either water or HCl alone.

The nature and objects of the invention having been thus fully described and illustrated, what is claimed as new and useful and desired to be secured by Letters Patent is:

1. A process for isomerizing paraffin hydrocarbons which comprises contacting at least one paraffin with aluminum chloride in an amount between about 10% and about 150% by weight based on the total hydrocarbons in the reaction zone at any one time under isomerization reaction conditions in the presence of between about 1 and about 20% by weight of at least one extraneously produced hydrogen halide based on the hydrocarbon in the reaction zone at any one time, maintaining water added as free water in the presence of the catalyst in the reaction zone in an amount between about 0.1 and about 2% by weight based on the total hydrocarbon present in the reactor at any one time and correlating the various materials and their quantities together with the reaction conditions to effect substantial isomerization of the paraffins.

2. A process which comprises isomerizing at least one straight chain paraffin with an aluminum halide under isomerizing reaction conditions, admixing at least one extraneously produced hydrogen halide in an amount between about 1 and about 20% by weight based on the total hydrocarbon in the reaction zone at any one time with the feed, adding sufficient free water to maintain between about 0.1 and about 2% by weight of water based on the total hydrocarbon in the reaction zone at any one time in the catalyst zone and correlating the various materials and their quantities together with the reaction conditions to effect substantial isomerization of the paraffins.

3. A process as in claim 2 wherein the water is introduced by steaming the aluminum halide catalyst to give the desired concentration of water in the reaction zone prior to contacting with the hydrocarbon feed.

4. A process as in claim 2 wherein the reaction is carried out under sufficient superatmospheric pressure to maintain the hydrocarbons in the liquid phase under the reaction conditions obtaining and wherein the reaction mixture is intensively agitated.

5. A process as in claim 2 wherein the feed stock is a light straight run paraffinic naphtha.

6. The process which comprises isomerizing at least one normal paraffin at a temperature between about −50 and about 250° F. with between about 10 and about 150% by weight of aluminum chloride based on the total hydrocarbons in the reaction zone at any one time, said reaction zone containing between about 0.1 and about 2% by volume of water based on the hydrocarbons present in the reaction zone at any one time and added to said zone as free water in the presence of between about 1 and about 20% by weight of extraneously produced HCl based on the hydrocarbons present in the reaction zone at any one time for between about ½ and about 15 hours in the liquid phase with intensive agitation and removing isoparaffins from the reacted mixture.

7. A process as in claim 6 wherein the feed is a refinery C₄ cut substantially free of olefins.

8. A process as in claim 6 wherein the reaction is carried continuously.

9. A process which comprises isomerizing normal butane to isobutane at a temperature between about 150 and about 225° F. with between about 10 and about 50% by weight of aluminum chloride based on the total hydrocarbons in the reaction zone at any one time, said reaction zone containing between about 0.1 and about 2% by weight of water based on the hydrocarbons present in the reaction zone at any one time and added to said zone as free water in the presence of between about 1 and about 20% by weight of extraneously produced hydrogen chloride based on the hydrocarbons present in the reaction zone at any one time for between about ½ and about 5 hours under sufficient superatmospheric pressure to maintain the hydrocarbons in the liquid phase and intensively agitating the reaction mixture.

10. A process which comprises isomerizing normal pentane to isopentane at a temperature between about 30 and about 100° F. with between about 100 and about 150% by weight of aluminum chloride based on the total hydrocarbons in the reaction zone at any one time, said reaction zone containing between about 0.1 and about 2% by weight of water based on the total hydrocarbons present in the reaction zone at any one time and added to said zone as free water in the presence of between about 1 and about 20% by weight of extraneously produced hydrogen chloride based on the hydrocarbons present in the reaction zone at any one time for between about ½ and about 5 hours under sufficient superatmospheric pressure to maintain the hydrocarbons in the liquid phase while intensively agitating the reaction mixture.

11. A process as in claim 9 wherein the reaction is carried out continuously and wherein the isobutane formed is continuously removed.

12. A process as in claim 10 wherein the reaction is carried out continuously and wherein the isopentane is continuously removed.

13. A process which comprises contacting normal butane with aluminum chloride in an amount of about 20% by weight based on the total hydrocarbon present in the reactor at any one time at a temperature of about 200° F. in the liquid phase with intensive agitation for about 4 hours under a superatmospheric pressure of about 280 lbs./sq. in. gauge, said catalyst having been previously employed for isomerizing wet normal butane prepared by substantially saturating liquefied normal butane with water at room temperature, the reaction zone containing about 2.7% by weight of extraneously produced hydrogen chloride based on the total hydrocarbons in the reaction zone at any one time, and recovering the resultant isobutane from the reaction mixture.

14. A process which comprises vigorously agitating normal pentane with aluminum chloride and between about 10 and about 15% by weight of extraneously produced hydrogen chloride based on the total hydrocarbon in the reaction zone at any one time and between about 0.5 and about 1% by weight of water based on the total hydrocarbon present in the reaction zone at any one time, said water having been added originally as free water to the reaction zone for about 2 hours at room temperature with vigorous agitation, the percentage of aluminum chloride being about 100% by weight based on the normal pentane charged, and recovering the resultant isopentane therefrom.

JOHN J. OWEN.